(12) United States Patent
Zamir et al.

(10) Patent No.: US 11,921,881 B2
(45) Date of Patent: Mar. 5, 2024

(54) ANONYMOUS RANKING SERVICE

(71) Applicant: EMC IP Holding Company LLC, Hopkinton, MA (US)

(72) Inventors: Amos Zamir, Beer Sheva (IL); Kfir Wolfson, Beer Sheva, IL (US); Jehuda Shemer, Kfar Saba (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 1098 days.

(21) Appl. No.: 16/529,418

(22) Filed: Aug. 1, 2019

(65) Prior Publication Data

US 2021/0034778 A1 Feb. 4, 2021

(51) Int. Cl.
*G06F 21/62* (2013.01)
*G06F 16/2457* (2019.01)
*G06F 16/435* (2019.01)

(52) U.S. Cl.
CPC .... *G06F 21/6245* (2013.01); *G06F 16/24578* (2019.01); *G06F 16/435* (2019.01); *G06F 21/6254* (2013.01)

(58) Field of Classification Search
CPC ............. G06F 21/6245; G06F 21/6254; G06F 16/435; G06F 16/24578
See application file for complete search history.

(56) References Cited

U.S. PATENT DOCUMENTS

| | | | |
|---|---|---|---|
| 7,734,680 B1* | 6/2010 | Kurapati | G06F 16/437 725/53 |
| 10,154,041 B2* | 12/2018 | Kohli | H04L 63/102 |
| 10,848,496 B2* | 11/2020 | Praszczalek | G06Q 10/063118 |
| 2003/0163518 A1* | 8/2003 | Thurston | H04N 21/252 348/E7.071 |
| 2004/0044565 A1* | 3/2004 | Kumar | G06Q 30/02 705/14.57 |
| 2009/0037355 A1* | 2/2009 | Brave | G06F 16/9535 706/45 |
| 2009/0307296 A1* | 12/2009 | Gibbs | G06F 16/435 708/607 |
| 2010/0030780 A1* | 2/2010 | Eshghi | G06F 16/3347 707/758 |

(Continued)

FOREIGN PATENT DOCUMENTS

| | | | | |
|---|---|---|---|---|
| CN | 107070660 B | * | 3/2020 | G06F 21/602 |
| JP | 4212773 B2 | * | 1/2009 | G06Q 30/02 |

(Continued)

OTHER PUBLICATIONS

Sovrin, "Sovrin: A Protocol and Token for Self-Sovereign Identity and Decentralized Trust," Version 1.0 (Year: 2018).*

(Continued)

*Primary Examiner* — Shahid K Khan

(74) *Attorney, Agent, or Firm* — Workman Nydegger

(57) ABSTRACT

Systems and methods for protecting data including user data. A recommendation service is disclosed that receives verifiable claims from a user. A verifiable output is generated from the verifiable claims. The verifiable output can be provided to service providers and allows the service providers to personalize their services to the user. The user's data is protected and exposure of the user's data is controlled by the user.

19 Claims, 7 Drawing Sheets

(56) References Cited

U.S. PATENT DOCUMENTS

| | | | |
|---|---|---|---|
| 2010/0186041 A1* | 7/2010 | Chu | H04N 21/6581 725/46 |
| 2010/0318919 A1* | 12/2010 | Murphy | G06F 16/48 715/745 |
| 2012/0174155 A1* | 7/2012 | Mowrey | H04N 21/4821 725/40 |
| 2012/0227064 A1* | 9/2012 | Neill | H04N 21/252 725/14 |
| 2014/0250105 A1* | 9/2014 | Shankar | G06F 16/9535 707/722 |
| 2014/0280223 A1* | 9/2014 | Ram | G06F 16/93 707/736 |
| 2015/0106365 A1* | 4/2015 | Shah | G06F 16/24 707/725 |
| 2015/0149484 A1* | 5/2015 | Kelley | G06Q 30/0631 707/748 |
| 2015/0199743 A1* | 7/2015 | Pinel | G06Q 30/0631 705/26.7 |
| 2016/0224803 A1* | 8/2016 | Frank | G06F 21/6245 |
| 2017/0238039 A1* | 8/2017 | Sabattini | G06F 16/4387 705/14.73 |
| 2018/0117446 A1* | 5/2018 | Tran | G06F 1/163 |
| 2018/0285996 A1* | 10/2018 | Ma | H04L 9/3297 |
| 2019/0222424 A1* | 7/2019 | Lindemann | H04L 9/0861 |
| 2019/0229914 A1* | 7/2019 | Patel | G06F 21/45 |
| 2020/0134656 A1* | 4/2020 | Padmanabhan | H04L 9/0637 |
| 2020/0313982 A1* | 10/2020 | Todd | H04L 41/5006 |
| 2020/0344237 A1* | 10/2020 | Murdoch | H04L 63/102 |
| 2020/0349276 A1* | 11/2020 | Murdoch | G06F 21/6245 |
| 2020/0379776 A1* | 12/2020 | Lo | G06Q 30/0269 |
| 2020/0387619 A1* | 12/2020 | Murdoch | G06F 21/604 |
| 2020/0403810 A1* | 12/2020 | Murdoch | H04L 67/10 |
| 2021/0051143 A1* | 2/2021 | Nelson | H04L 63/0807 |

FOREIGN PATENT DOCUMENTS

| | | | | |
|---|---|---|---|---|
| WO | WO-0124047 A2 * | 4/2001 | | G06F 16/437 |
| WO | WO-03077112 A1 * | 9/2003 | | G06F 17/30867 |
| WO | WO-2007057800 A2 * | 5/2007 | | G06F 16/634 |
| WO | WO-2016028793 A1 * | 2/2016 | | G06F 17/30053 |
| WO | WO-2016189293 A1 * | 12/2016 | | G06F 21/602 |

OTHER PUBLICATIONS

Frey, "Collaborative Filtering on the Blockchain: A Secure Recommender System for e-Commerce," San Diego (Year: 2016).*

Casino et al., "An Efficient Blockchain-Based Privacy-Preserving Collaborative Filtering Architecture," IEEE Transactions on Engineering Management, vol. 67, No. 4, Nov. 2020 (first published Jun. 6, 2019) (Year: 2019).*

Sovrin Foundation; "Sovrin: A Protocol and Token for Self-Sovereign Identity and Decentralized Trust"; Version 1.0, Jan. 2018.

Reed, Drummond, et al; "Decentralized Identifiers (DIDs), v0.13, Data Model and Syntaxes"; Draft Community Group Report, Jul. 10, 2019.

Sporny, Manu, et al.: "Verifiable Credentials Data Model 1.0, Expressing verifiable information on the Web"; W#C Candidate Recommendation Jul. 25, 2019.

* cited by examiner

| Feature Name | Alumni Credential | Age Credential | Marital Status |
|---|---|---|---|
| Value | X University | 29 | Married |

Figure 8

ANONYMOUS RANKING SERVICE

FIELD OF THE INVENTION

Embodiments of the invention relate to identity systems and methods. More particularly, embodiments of the invention relate to systems, methods, and apparatus for anonymizing user identities and to anonymous ranking service systems and methods.

BACKGROUND

One of the concerns with online activities relates to privacy and personal information. This concern is not unfounded. Many services collect personal information in order to personalize their services, optimize sales, and for other business reasons. In addition, some services may aggregate personal information and trade or sell that information to other services or business. In many cases, users are not able to control the information they want to expose publicly or control the information they want to keep private.

Even privacy-aware users are giving their personal information to companies and corporations because they want to use their services. In fact, users may not have a meaningful choice. For example, some providers require personal information in order to register. If the user does not register, the user may not receive a discount or other preference. In some instances, the user will not be able to use the service at all.

There are, however, legitimate reasons for collecting personal information. The service, for example, may need certain information in order to comply with applicable regulations. For example, a user's age may be necessary before access is granted to certain services such as purchasing alcoholic beverages.

There is always a fear, however, that information will be used or disclosed in a manner that is not in accordance with the user's desires. For example, some service providers support the OAuth 2.0 protocol, which gives the ability to authenticate their service. This also allows these service providers to provide tokens to other services, which gives the other services access to at least some user data. This may protect the user from exposing their data to the other providers. However, large service providers hold large amounts of private data and are able to use the data without additional approval from users. In fact, the user may not be aware of the information exposed by one service provider to another third party.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 8 illustrates an example of a feature vector.

DETAILED DESCRIPTION OF SOME EXAMPLE EMBODIMENTS

Figure 1:
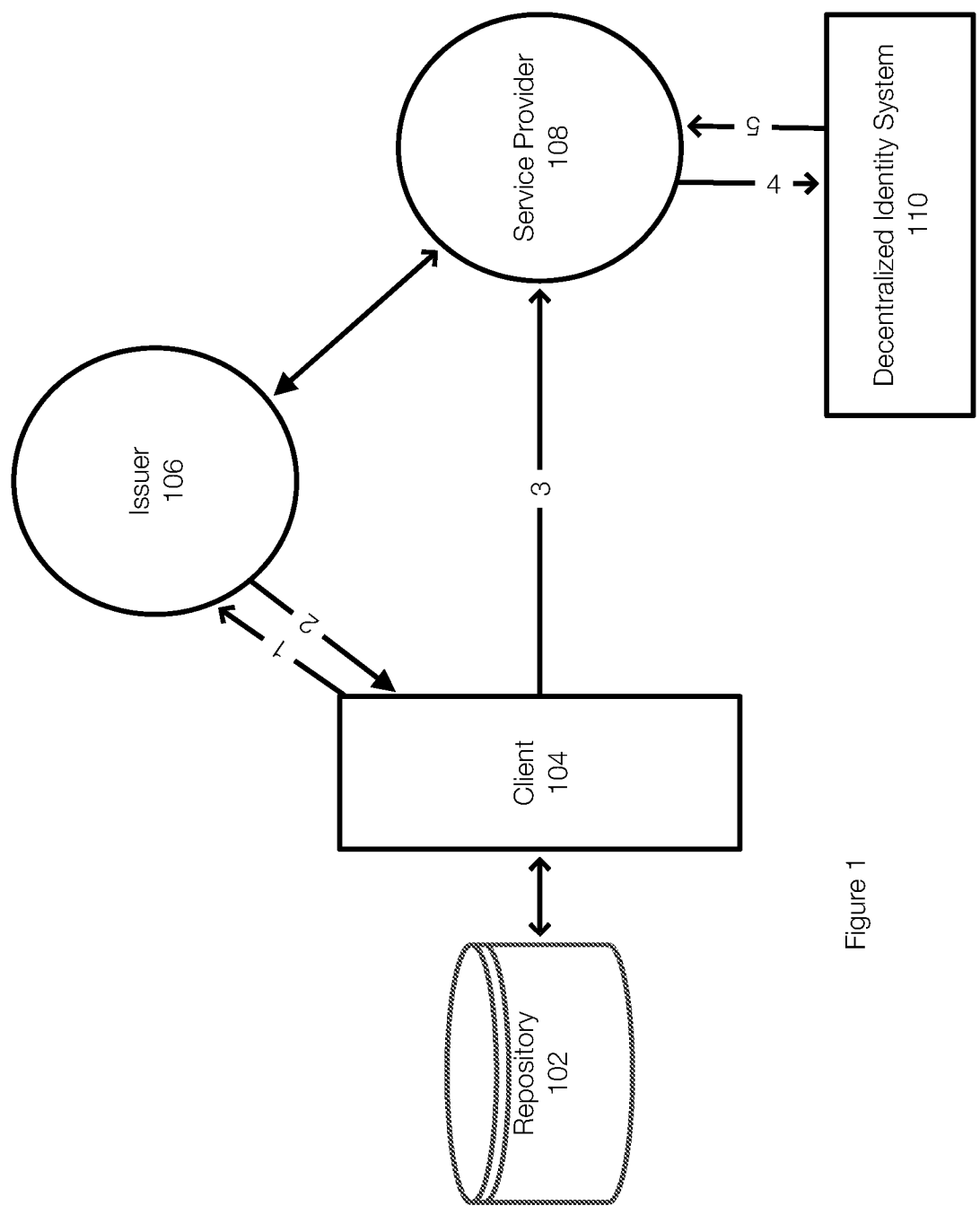
FIG. 1 illustrates an example of a decentralized identity system.

Embodiments of the present invention generally relate to data protection and to systems, methods, and apparatus for performing data protection operations. Examples of data protection operations include maintaining user data, anonymizing user data, or controlling how data such as user data is used or exposed to third parties or other service providers. Embodiments of the invention further relate to systems and methods for ranking or scoring user data such that the user data can be used for business purposes without reducing the level of service for users and while exercising control over how the data is used or exposed. Embodiments of the invention further relate to profiling a user for specific business providers using an external recommendation system.

The recommendation system can generate a result or an output (e.g., a score, a level of service, a classification or other indicator) as a service for the use of other service providers. The output of the recommendation service may be tied or related to a cryptographic decentralized identifier to protect the user's anonymity, while still providing the service provider with information to work with to create a ranking, a service level and/or access control.

In one example, identity or a concept of identity can be based on a decentralized system. An example of a decentralized identity system, which may be based on blockchain technologies, may provide decentralized identifiers (DID). The appendix includes an example of a decentralized identity system. This identity system gives control of user data back to the user and helps the user control what data is shared or exposed to service providers. In one example, the shared data may be referred to as a verifiable claim. Verifiable claims allow a user to share personal information with a service provider in a controlled manner. Further, the verifiable claims can be verified by the service provider.

However, the user may still need to share substantial personal information with the service provider in order to gain more benefit or prioritization compared to anonymous users. Embodiments of the invention relate to systems and methods for preserving user privacy that may leverage, for example, DID protocols. Further embodiments of the invention allow a user to control their privacy or what data is exposed without reducing the level of service received from the service providers and while satisfying the business needs of the service providers.

For example, a service provider (e.g., a search engine, a social media entity, a retail entity,) may require private information from users for several reasons such as personalizing the service, optimizing sales or business cases, security, and regulations. The private information may include, by way of example only, name, social security number, date of birth (or age), marital status, country, gender, credit card details, and/or the like.

Some of the private information requested by a service provider may not be required. However, the ability to use the service may depend on the user supplying the requested information.

As previously stated, the private data of users is often at risk and users often have little or no control over how their personal or private data is used. A decentralized identity protocol can give power to the users. This allows users to hold their private information and choose what information is exposed to whom.

FIG. 1 illustrates an example of how a decentralized identity system may operate and function. In this example, a client 104 (e.g., a user) is associated with a repository 102. This may be a personal storage device of the user. Initially, the client 104 may (1) request a claim from the issuer 106. More specifically, the user may desire that the issuer 106 verify certain information.

For example, the client 104 may wish to obtain a verifiable claim regarding their location. A request for a verifiable claim relating to the user's location may be sent to the issuer 106 (e.g., a mobile network operator). The issuer 106 can then (2) provide the client 104 with a verifiable claim regarding the location of the client 104. The verifiable claim may be encrypted with a private key held the issuer 106 and that is part of the decentralized identity system 110. By signing or encrypting the verifiable claim with a key, the verifiable claim cannot be tampered with or changed. At the same time, the client 104 has received information that can be substantiated by the service provider.

Once the client 104 has received the verifiable claim from the issuer 106, the client 104 can then (3) provide the service provider 108 with the verifiable claim, which has been encrypted by the issuer 106. In this example, the service provider 108 may then (4) request a public key of the issuer 106 from the decentralized identify system 110, which may be implemented as a blockchain system. The decentralized identify system may provide (5) the public key to the service provider 108 and the service provider 108 can then verify the verifiable claim received from the client 104. In one example, the service provider 108 may trust the issuer 106. Once the claim has been substantiated or verified, the service provider 108 may use the data included in the verifiable claim in serving or responding to the client 104.

In one example, at least the issuer 106 and the service provider 108 have a DID identifier or key. This allows the issuer 106 to encrypt the verifiable claim with a DID private key and allows the encrypted verifiable claim to be decrypted by the service provider 108. The decentralized identity system 110 allows a user to control the information provided to the service provider. The DID allows the user or client 104 to be anonymous in one example.

Figure 2:
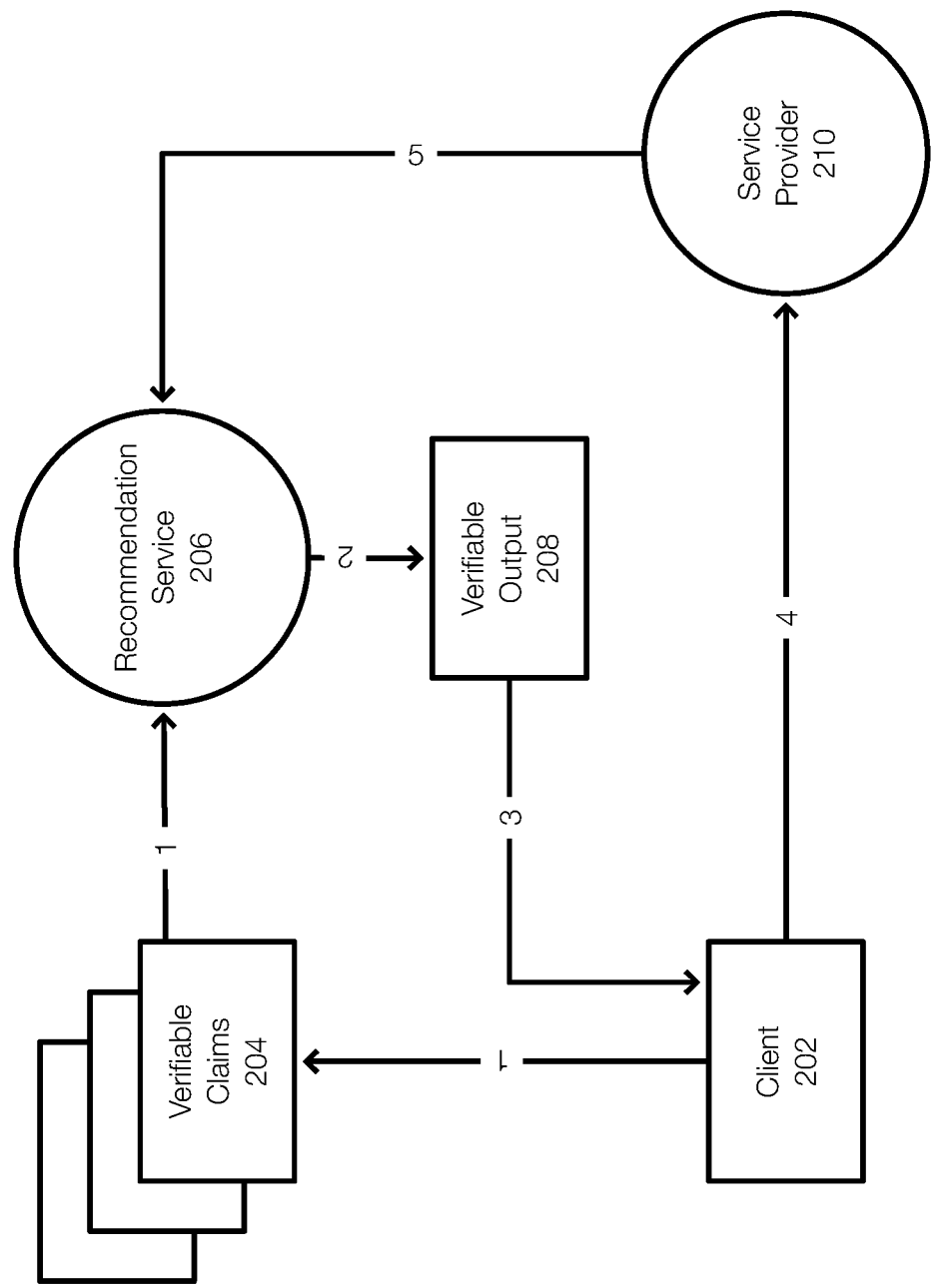
FIG. 2 illustrates another example of a decentralized identify system.

FIG. 2 further illustrates systems and methods for controlling user data or for profiling a user as a service. Embodiments of the invention may profile a user such that a user can received services from a service provider while controlling how and what user information is exposed to the service provider. FIG. 2 illustrates an example of a system that allows users to control their data (e.g., control what data is exposed to a service provider). In one example, embodiments of the invention decouple the recommendation from the service provider. This helps preserve privacy and allows the user to have more control over their data.

More specifically, FIG. 2 illustrates that a client 202 (e.g., a user) may provide verifiable claims 204 to a recommendation service 206. In one example, the verifiable claims 204 are anonymous. In one example, a verifiable claim may bind a unique identifier to an identifier from the decentralized identify system. In one example, a user may hold or be associated with many identifiers and it is not trivial to correlate the end user from many verifiable claims. This helps preserve the anonymity of the user. Verifiable Credentials Data Model 1.0 http://www.w3.org/TR/2019/CR-vc-data-mode-20190725/ is incorporated by reference herein.

In one example, the verifiable claims 204 have been signed from an issuer as previously described with respect to FIG. 1. Thus, FIG. 2 builds, in one example, on the decentralized identify system shown in FIG. 1 by allowing the client 202 to send verifiable claims that have been signed by an issuer to the recommendation service 206.

The recommendation service 206 may then identify or build a profile based on the verifiable claims 204 and generate a verifiable output 208 (an example of a verifiable claim) based on the verifiable claims 204. In one example, the verifiable output 208 includes at least one of the verifiable claims 204 (or the data therein) and/or a generalized version of the verifiable claims 204, and/or information that is representative of the client 202. The information that is representative of the client 202 may not actually correspond specifically to the client 202.

The recommendation service 206 may generate the verifiable output 208 by augmenting the verifiable claims 204 with additional information, for example, that may be determined statistically and/or that is based on other data sets and/or that is based on other users. In addition, the verifiable output 208 may be configured to provide a service provider with values or information that can be used to suit the needs of the service provider.

In some examples, the verifiable output 208 or portions thereof may also be generalized. For example, the service provider 210 may need to know that the age of the user is above a threshold age. The verifiable output 208 may verify that the user is over 18 without specifying an actual age.

After receiving the verifiable output 208 from the recommendation service 206, the client 204 then provides the verifiable output 208 to the service provider 210 and the service provider 210 provides personalized services to the client 202 based on the verifiable output 208.

In one example, the service provider 210 may determine that the verifiable output 208 is not optimal or is incorrect. The service provider 210 may provide feedback to the recommendation service 206 that allows the recommendation service 206 to learn from the service provider 210. In one example, the service provider 210 can provide feedback for specific verifiable outputs and this feedback can be used by the recommendation service 206 for machine learning purposes or for model retraining purposes.

The recommendation service 206 may encrypt the verifiable output 208 with a DID key. In another example, no encryption is performed. Rather, the verifiable claim or the verifiable output is signed. It may be possible to assume that the communication between the service provider and the client and/or between the recommendation service and the client is secure. This allows the service provider 210 to decrypt the verifiable output 208 and ensures, in one example, that the client 202 does not tamper with the verifiable output 208.

Figure 3:
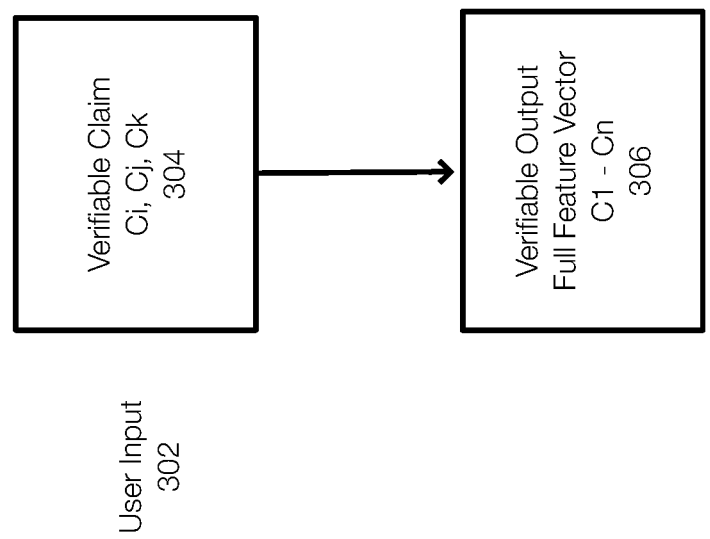
FIG. 3 illustrates an example of transforming raw data or into a full feature vector or a full feature verifiable claim.

FIG. 3 illustrates an example of converting a verifiable claim received from a user that can be transformed into a full featured verifiable claim. FIG. 3 illustrates that the verifiable claim 304 (an example of the verifiable claims 204) may include one or more raw data points such as $C_i$, $C_j$, and $C_k$. Each of these data points may have been verified by an issuer in accordance with a decentralized identity system using DID identifiers or keys. Each of these data points may themselves be verifiable claims. The verifiable claim 304 may be a set of statements or data made by a first entity about a second entity.

In one example, the data points Ci, Cj, and Ck are raw claims or data from which verifiable claims are derived. A mobile provider, for example, obtain a location of a user (raw data) and issue a verifiable claim substantiating the location of the user from the mobile provider. A verifiable claim signed by a credit card issuer may verify a user's card number, a name on the card, and an expiration of the user's card. A university may affirm that a person has a certain degree. A healthcare provider may affirm certain medical information. Similarly, other issuers can sign other information about a user including private information.

The recommendation service 206 may receive a verifiable claim from a client or user. The recommendation service 206 can verify the verifiable claim using the DID keys. Next, when a verifiable claim 304 is received by the recommendation service 206, the recommendation service 206 may add features or information to effectively transform the verifiable claim 304 into a verifiable output 306. The verifiable output claim 306 may include features $C_1$-$C_n$. The features added to the verifiable claim 304 may be derived from other users and/or based on statistical analysis of other information and/or other filtering. The verifiable output 306 is an example of a full featured vector, although there is no requirement that all possible entries in the full featured vector contain data.

In one example, the features added to the verifiable claim 304 may be added using collaborative filtering. Collaborative filtering allows the recommendation service 206 to make predictions about a user by collecting preferences or information from many users. For example, if user A has the same opinion as user B on an issue C, then the user A is more likely to share the same opinion as user B on another issue D compared to a randomly selected user.

A collaborative recommendation system may make predictions about a user's television viewing preferences given a partial list of that user's television viewing preferences. As a result, the verifiable output 306 may contain information of a specific user. The verifiable output 306 may also contain information that is not necessarily specific to the user because the information is added based on other users or factors. In addition, the information specific to the user may be generalized by the model. A user's age of 33, for example, may be represented as between 30-40 in the verifiable output 306. Information that a user that likes a specific movie, for example, may be represented as liking a genre in the verifiable output.

Figure 4:
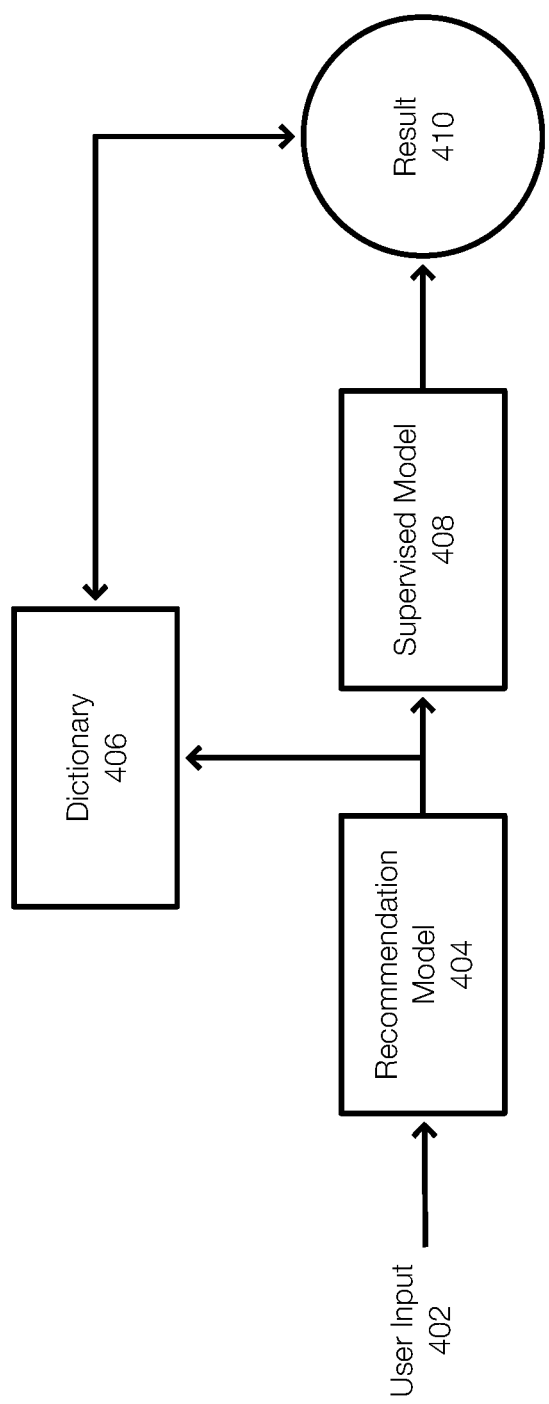
FIG. 4 illustrates an example of a recommendation service.

FIG. 4 illustrates an example of a recommendation service. FIG. 4 illustrates that that user input 402, which may include verifiable claims, may be received by a recommendation model 404 (e.g., SVD (singular value decomposition), CUR (CUR matrix approximation)) from a user or a client. The recommendation model 404 may derive the raw data from the user input 402 and match the raw data to the indexes of a feature vector for a supervised model 408. The feature vector is an example of verifiable output. A feature vector may include multiple entries (e.g., $C_1$-$C_n$). The feature vector is also an example of a profile.

The raw data Ci, Cj, and Ck may be matched to corresponding entries of the verifiable output or the full feature vector, which typically includes more entries. The recommendation model 404 then completes the missing features using statistical models, collaborative filtering or the like. The profile or feature vector generated by the recommendation model 404 is configured to be an augmented version of the verifiable claims received from the user.

In one example, the recommendation model 404 fills out the missing features by observing previous input and outputs of the same user and/or different users. The completed feature vector may then be provided to the supervised model 408 and to a dictionary 406. In one example, the dictionary 406 may include a key and a value pair where the key is the generated unique ID and the value is a full feature vector. In one example, the dictionary 406 allows a service provider to send feedback to the recommendation system without knowing the full feature vector. The service provider may only send the key and the feedback and the dictionary 406 can be used to convert back to or obtain the full feature vector.

The supervised model 408 may generate a result 410 (e.g., a verifiable output) that is returned to the user and that that may then be provided to a service provider. In one example, the verifiable output could be provided directly to the service provider. The result 410 is configured to satisfy a business case or other usage requirements of the service provider. The result 410 may be a score, a classification, or the like.

For example, the result 410 may reflect a score indicating a likelihood of the user to make a purchase or indicating that the user likes a specific movie genre. If the service provider is a streaming service, an indication that the user like a certain genre allows the streaming service to personalize recommendations accordingly. If the verifiable output also includes an age (or an age range), the recommendations provided by the streaming service can be further tailored to account for the genre and the age.

The service provider may be able to suggest additional features to be included in the feature vector. The recommendation service can adapt its standard feature vectors over time and in response to feedback from the service provider and/or from the users. As a result, the recommendation service allows a user to control how data is exposed. In this example, the user's specific information is not explicitly exposed. The service provider may have only received an age range and a genre. However, this allows the service provider to use the verifiable output for business purposes while, at the same time, protecting the user's privacy. The streaming service is not able to share the verifiable output as effectively as the streaming service could share information explicitly received from the user.

Thus, byway of example only, the result 410 or verifiable output may include one or more classifications and/or a regressor and/or a score. The supervised model 408 may indicate that the user is a "cyber expert" or "loves movies" or provide a score such as 0.5 on a scale of 0-1 (or other scale) with regard to various features.

In one example, the feature vectors may be designed with the service provider in mind. Thus, the feature vector for a sport-driven website may differ from the feature vector for a streaming service.

The full feature vector or output is stored in the library or dictionary 406 along with a unique identifier (GUID) or key. The identifier or key may also be provided to the service provider along with the verifiable output or result 410 of the supervised model 408. The service provider that receives the result 410 may be able to provide feedback with respect to a particular result. The key allows the feedback to be associated to a specific result or feature vector. The supervised model 408 can then be retrained using the feature vector and the feedback from the service provider.

In one example, the verifiable output may also be signed with a DID key or identifier. This allows the service provider to confirm the verifiable output received from the user. In some examples, the service provider may have a level of trust with the recommendation service. This facilitates the ability of the service provider to receive a result that is suitable for the service provider's purposes while still protecting the data of the user.

Figure 5:
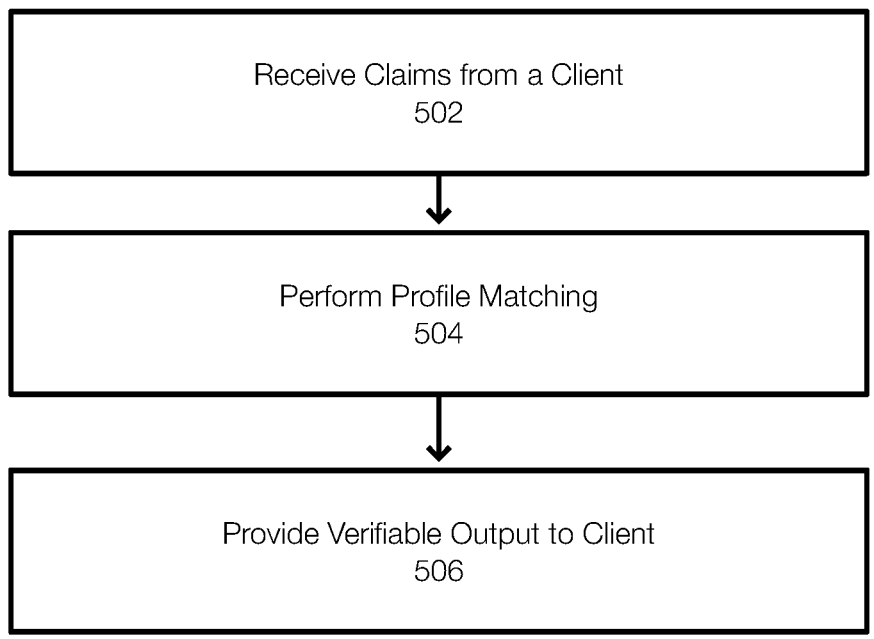
FIG. 5 illustrates and example of generating a verifiable output as a service.

FIG. 5 illustrates an example of a method for generating a verifiable output. A recommendation service may receive 502 verifiable claims from a client (or a user via a computing device). The verifiable claims may have been signed by an issuer that has a DID identifier and that participates in a decentralized identity system.

The recommendation service may then perform 504 profile matching. Profile matching allows the recommendation service to generate a full feature vector based on limited information included in the verifiable claims. For example, the verifiable claims may include 2 or three data points (e.g., age, location). The full feature vector may include a larger number of data points. These other data points can be obtained from an existing dictionary, by statistical processing, collaborative or other filtering, matrix manipulation, or the like or combination thereof.

The full feature vector, one generated, may be provided 506 as verifiable output to the client. The verifiable output is typically signed by the recommendation service with a DID key or identifier. Augmenting user data, which may include generalizing the user's data or anonymizing the user's data, into a full feature vector is an example of generating a profile that is suitable for a business use.

Figure 6:
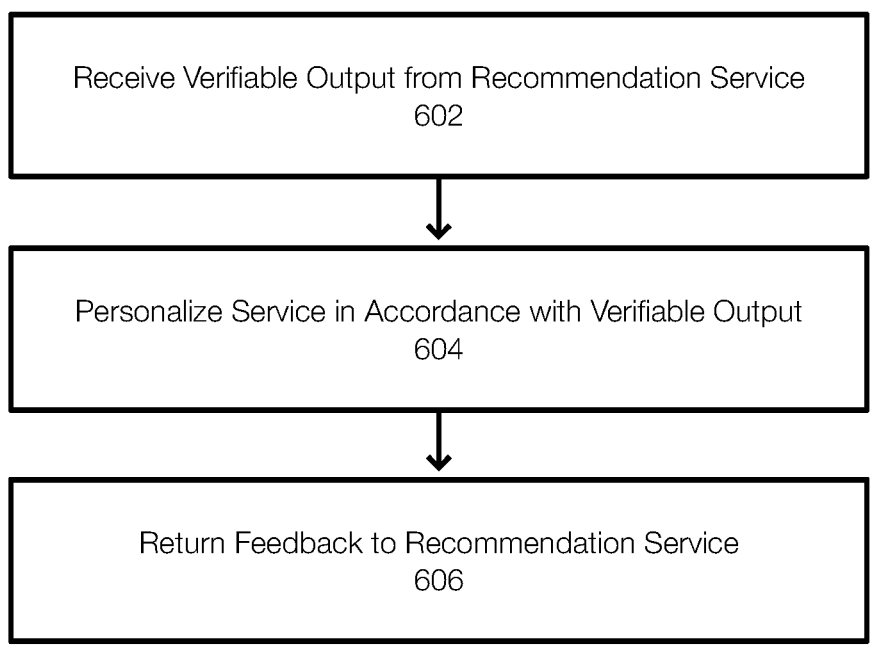
FIG. 6 illustrates an example of personalizing services based on a verifiable output.

FIG. 6 illustrates an example of providing user data to a service provider, such as a website. The service receives 602 verifiable output from the recommendation service. The verifiable output is generally received via a user or client. The service provider can then authenticate or verify the verifiable output by obtaining a public key from a decentralized identity system. If the verifiable output was signed with a private key of a trusted recommendation service, the ability to access the verifiable output using the corresponding public key provides a level of trust and gives the service provider confidence in the verifiable output.

The service provider may then personalize 604 the service in accordance with the verifiable output. This personalization may depend on the service. A content streaming service, for example, may use the verifiable output to recommend movies for rent or purchase. A car dealership may use the verifiable output (which may include a range of a user's income and/or credit score or a different representative score of the user's credit worthiness and ability and propensity to buy) to offer a certain interest rate.

Optionally, the service provider may send 606 feedback to the recommendation service. This can occur in all cases or in some cases. In one example, feedback is provided when there is an issue with the verifiable output. For example, verifiable output indicating that the user is likely to buy movies of a particular genre, may contrast with the actual purchase made by the user of a different genre. This feedback allows the recommendation service to tune its library, improve the manner in which verifiable output is determined, or the like.

Figure 7:
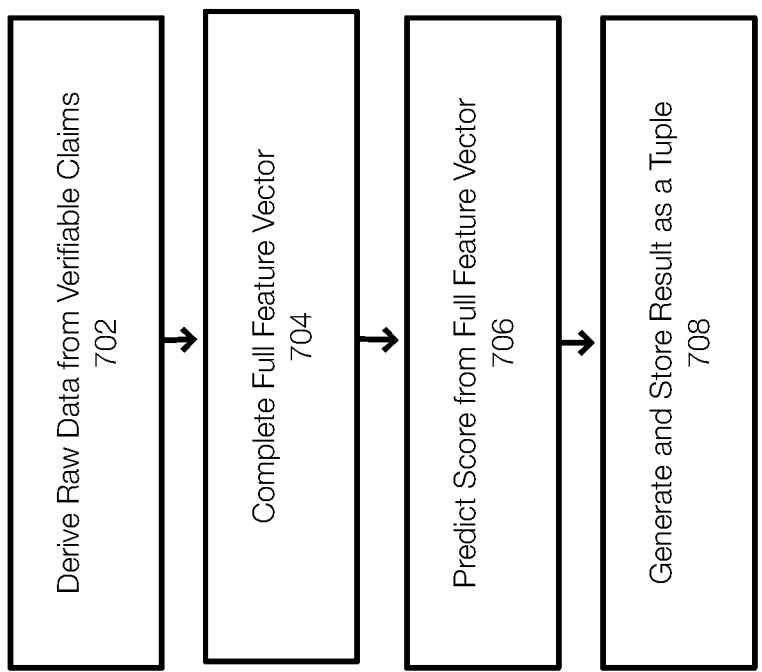
FIG. 7 illustrates another example of generating a verifiable output.

FIG. 7 illustrates an example of generating verifiable output. The service provider may derive 702 raw data from a verifiable claim. For example, the recommendation service may extract the user's location from a verifiable claim signed by a mobile provider. Based on the raw data, the service provider may complete 704 a full feature vector as previously described.

Next, the service provider may predict a score from the full feature vector 706. This illustrates that, in one example, the verifiable output may simply include a score rather than the vector itself. Alternatively, the verifiable output may include certain classifications and/or a score rather than the vector itself. In another example, the verifiable output may include at least a portion of the feature vector, although some of the data may be generalized.

The service provider may also generate and store 708 the result (e.g., verifiable output or the full feature vector) as a tuple. The stored result can be used in the generation of other full feature vectors, for feedback purposes, model training, or the like or combination thereof.

In one example, the verifiable claims can be specified or described in different manners. In one example, each verifiable claim may be described as subject-property-value or subject-property-subject. For example, a claim type of alumni credential can claim that Tom is an alumni of X university by specifying the DID of Tom and a value of X university.

FIG. 8 illustrates an example of a feature vector that may be derived from raw data. In FIG. 8, the vector 800 identifies a feature name, an alumni credential (value=X university), an age credential (value=29), and a marital status (value=married). Each entry is associated with a value. When generating the verifiable output, this information may be incorporated and augmented as previously described. The full feature vector may many more than three entries.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data management operations. Such data management operations may include, but are not limited to, data read/write/delete operations, data backup operations, data restore operations, data cloning operations, data archiving operations, and disaster recovery operations. Thus, while the discussion herein may, in some respects, be directed to a discussion of data protection environments and operations, the scope of the invention is not so limited. More generally then, the scope of the invention embraces any operating environment in which the disclosed concepts may be useful. By way of illustration, but not limitation, embodiments of the invention may be employed in connection with data backup and restore platforms such as the Dell-EMC NetWorker and Avamar and Data Domain platforms.

A data protection environment may take the form of a public or private cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, and VMs.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, containers, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'model' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. The appendices are incorporated by reference herein.

What is claimed is:

1. A method for generating a verifiable output that represents a user's data, the method comprising:
   receiving verifiable claims from a user at a recommendation service, wherein the verifiable claims are signed in accordance with a distributed identity system by issuers of the verifiable claims and wherein the verifiable claims are generated by the distributed identify system in response to a request from the user;
   perform profile matching to convert the verifiable claims into a full featured vector by the recommendation service;

generating the verifiable output from the full featured vector, by the recommendation service, by augmenting private data of the user in the verifiable claims with data from other users;

providing the verifiable output to the user, wherein the verifiable output generated by the recommendation service is decoupled from the service provider;

providing the verifiable output to a service provider, wherein the service provider provides personalized services to the user using the verifiable output, wherein the verifiable output only includes the private information of the user chosen to be shared by the user.

2. The method of claim 1, wherein the other data is obtained from collaborative filtering, statistical analysis, or input and output data associated with other users.

3. The method of claim 1, wherein the verifiable claims are signed by an issuer.

4. The method of claim 1, further comprising accessing a dictionary to perform the profile matching.

5. The method of claim 1, further comprising generalizing the user's data from the verifiable claims when adding to the full featured vector.

6. The method of claim 1, wherein the verifiable output comprises a score, a classification, of the full featured vector.

7. The method of claim 1, further comprising sending the verifiable output to the user or to a service provider, wherein the verifiable output is signed with a decentralized identity system identifier.

8. The method of claim 1, further comprising sending the verifiable output to the service provider, wherein the service provider personalizes a service in accordance with the verifiable output.

9. The method of claim 1, further comprising receiving feedback from a service provider that personalized a service using the verifiable output, wherein the feedback is incorporated into the generation of subsequent verifiable outputs.

10. The method of claim 1, wherein the distributed identity system comprises a blockchain implemented distributed identify system.

11. The method of claim 1, further comprising including classifications or scores in the verifiable output.

12. A method for personalizing services for a client, the method comprising:

receiving, at a service provider, a verifiable output generated by a recommendation service, wherein the verifiable output is signed using a private key in accordance with a decentralized identity system, wherein generation of the verifiable output performed by the recommendation service is decoupled from the service provider, wherein the recommendation service augments private data of a user with data from other users when generating the verifiable output such that user data included in the verifiable output includes the private data of a user and the data from the other others;

identifying the user data included in the verifiable output by requesting a public key from the decentralized identity system and decrypting the verifiable output; and personalizing a service provided by the service provider based on the user data included in the verifiable output, wherein the private information of the user is chosen to be shared by the user.

13. The method of claim 12, further comprising receiving the verifiable output from the recommendation service via the client.

14. The method of claim 12, wherein the verifiable output is configured specifically fora business use of the service provider.

15. The method of claim 12, wherein the verifiable output includes one or more scores and/or one or more classifications, wherein the one or more scores and the one or more classifications are suitable for a business use of the service provider.

16. The method of claim 12, further comprising providing feedback to the recommendation service at least when the verifiable output is not optimized for the business case.

17. The method of claim 16, further comprising retraining the recommendation service based on the feedback.

18. A recommendation service comprising:

a plurality of servers, wherein each server in the plurality of servers includes a processor;

a computer storage medium that stores computer-executable instructions that are executable by each processor to at least implement:

a recommendation model configured to receive input of a user and convert the input into a full feature vector suitable for a business case of a service provider, wherein the input includes verifiable claims with private data of the user, wherein the verifiable claims are generated by one or more issuers in response to a request from the user;

a supervised model configured to generate a verifiable output from the full feature vector, wherein the verifiable output includes at least one of a score, a classification, or the full feature vector, wherein the verifiable output includes the private data of the user and data of other users, wherein the private data is chosen to be shared by the user and wherein the verifiable output is decoupled from the service provider, wherein the verifiable output is configured to enable the service provider to provide personalized services.

19. The recommendation service according to claim 18, wherein the recommendation model is configured to generalize the user input when generating the full feature vector.

* * * * *